United States Patent [19]
Han

[11] Patent Number: 6,092,205
[45] Date of Patent: Jul. 18, 2000

[54] DEVICE FOR AUTOMATICALLY LOCKING A POWER BUTTON IN A COMPUTER

[75] Inventor: Min-Goo Han, Seoul, Rep. of Korea

[73] Assignee: Daewoo Electronics Co., Ltd., Seoul, Rep. of Korea

[21] Appl. No.: 09/079,444

[22] Filed: May 15, 1998

[30] Foreign Application Priority Data

May 30, 1997 [KR] Rep. of Korea ...................... 97-21885

[51] Int. Cl.[7] ........................................................ G06F 1/26
[52] U.S. Cl. ......................... 713/300; 713/323; 434/118; 434/317; 434/365; 128/200.23; 128/204.23; 128/205.23; 128/200.14
[58] Field of Search .................................. 713/300–340; 434/118, 365, 317; 128/200.14, 204.23, 205.23, 200.23

[56] References Cited

U.S. PATENT DOCUMENTS

| 5,193,176 | 3/1993 | Brandin . |
| 5,815,409 | 9/1998 | Lee et al. ............................ 364/528.21 |
| 5,918,059 | 6/1999 | Tavallaei et al. ........................ 713/300 |

FOREIGN PATENT DOCUMENTS

| 0 797 137 | 9/1997 | European Pat. Off. . |
| 06161612A | 6/1994 | Japan ................................. G06F 1/26 |
| 2 241 382 | 8/1991 | United Kingdom . |

*Primary Examiner*—Ayaz R. Sheikh
*Assistant Examiner*—Rupal Dharia
*Attorney, Agent, or Firm*—Pillsbury Madison & Sutro LLP

[57] ABSTRACT

A device for automatically locking a power button in a computer is to prevent a power button from operating by someone when the user uses a mouse. The device has a power button blocking part 100 installed between a power button 420, which moves forward and backward through a button receiving hole 410 of a computer main body 400, and a power switch 430, which is selectively turning on or off the power switch 420 depending on the pressing operation of the power button 420. The power button blocking part 100 blocks between the power button 420 and the power switch 430 when the cover 510 of the mouse 500 connected to the computer main body 400 is loaded thereon. The power button blocking part 400 is driven by a driving part installed in the mouse 500. The driving part provides power obtained from the power circuit 300 to the power button blocking part 100 when the cover of the mouse is loaded thereon. Therefore, the power button blocking part blocks between the power button and the power switch.

5 Claims, 3 Drawing Sheets

DEVICE FOR AUTOMATICALLY LOCKING A POWER BUTTON IN A COMPUTER

BACKGROUND OF THE INVENTION

1. Field of the Invention

The present invention relates to a device for automatically locking a power button in a computer, more particularly to the device for automatically locking the power button in the computer which prevents the computer power from turning off even though a child presses the power button during the computer operation at home, and thus a user can continue to do his computer work.

2. Description of the Prior Art

A computer is frequently used at home due to a spread of low price computers. A computer user can do a variety of computer work, e.g., text editing, figure drawing, internet surfing, and communication, etc., at home. However, when the computer is used at home when a child present, the child may frequently press a button installed at a keyboard or at a computer main body because the child may be full of curiosity or may want to attract the computer user's interest. Especially, when the child presses a power button in the computer main body during the computer work, the computer work is able to be interrupted, and important data may be lost.

For example, as shown in FIG. 3, when the child presses the power button 420 installed at the computer main body 400 during the computer work with a mouse 500, the user loses the unstored data. Further, the user has a problem that the computer operation does not continue because the computer must be turned on again for resuming his computer work.

Therefore, various methods for preventing the loss of data which may occur when the electric power is removed unexpectedly are proposed.

One such method described in the patent to Brandin, U.S. Pat. No. 5,193,176, "computer work saving during the power interruption" discloses the saving apparatus and method of the computer work for preventing the loss of the application program or the loss of data by storing the advanced application program or the data connected with the advanced application program into the nonvolatile memory as the back up area even though the power is abruptly removed during the running of the application program.

However, the conventional system saves the state of the advanced application program and the related data in the nonvolatile storage medium under backup power when the power source is abruptly turned off during the running of the application program. Thus, the conventional system for preventing the loss of the application program or the loss of data in the computer is inconvenient because the main power source must resume when the user wants to continue to do his computer work. Further, the conventional system has a problem that the user cannot continue to work.

SUMMARY OF THE INVENTION

Therefore, the present invention has been developed to solve the above problems. An object of the present invention is to provide the device for automatically locking the power button in the computer in which the power does not turn off even though the child presses the power button during the computer operation with the mouse.

To accomplish the above object, the device for automatically locking the power button in the computer according to the present invention has a power button blocking part. The power button blocking part is installed between a power button, which is inserted into a button receiving hole of the computer main body and moves forward and backward through the button receiving hole, and a power switch, which is switched by a pushing operation of the power button and thus decides whether power is provided to the computer main body or not. The power button is blocked by the power button blocking part when the user puts his hand on the cover of the mouse connected to the computer main body. The power button blocking part is connected to a driving part for generating a driving signal when the user puts his hand on the cover through a power circuit. The driving part is installed inside the mouse. The driving part has contacting protrusions for composing a closed loop with the power circuit and the power button blocking part. The contacting protrusions are composed of upper contacting protrusions protruded toward lower direction of the mouse cover at a predetermined length and lower contacting protrusions protruded toward upper direction of a base plate of the mouse at a predetermined length. Thus, the upper contacting protrusions and the lower contacting protrusions are contacted with each other when the user puts his hand on the mouse cover. Also, a spring has an end fixed to the cover and the other end fixed to the base plate and provides the elastic force to the cover for separating the upper and lower contacting protrusions from each other when the user removes his hand from the cover of the mouse. The power button blocking part has supporting plates and electromagnetic members. The supporting members are opposite to each other and are fixed to the computer main body. Each of the supporting members has a piercing hole for moving a pressing rod of the power button in forward and backward directions. The pressing rod protrudes from a rear face of the power button and is supported by elastic force. The electromagnetic members are installed between the supporting plates and block the piercing holes by the electromagnetic force when the user puts his hand on the mouse cover. That is, when the user puts his hand on the mouse cover, the electromagnetic forces having different polarities are excited at the electromagnetic members respectively. Thus, the electromagnetic members attract each other. The electromagnetic members slide along guiding holes formed at the supporting plates for blocking the piercing holes in a longitudinal direction of the supporting plates. Returning springs are inserted between and have both ends fixed to the electromagnetic members. Thus, when the user removes his hand from the mouse cover, the electromagnetic members separate from each other by the elastic force of the returning spring, and then the piercing holes open.

In the device for automatically locking the power button in the computer according to the present invention having the construction described above, and since the power button does not operate when the user uses the mouse, the user can continue to do his computer work with the mouse without anxiety even though a child presses the power button.

BRIEF DESCRIPTION OF THE DRAWINGS

The above objects and other advantages of the present invention will become more apparent by describing the preferred embodiment thereof with reference to the attached drawings in which.

DETAILED DESCRIPTION OF THE PREFERRED EMBODIMENT

A description will be given below in detail with reference to the accompanying drawings of the embodiment of the present invention.

Figure 1:
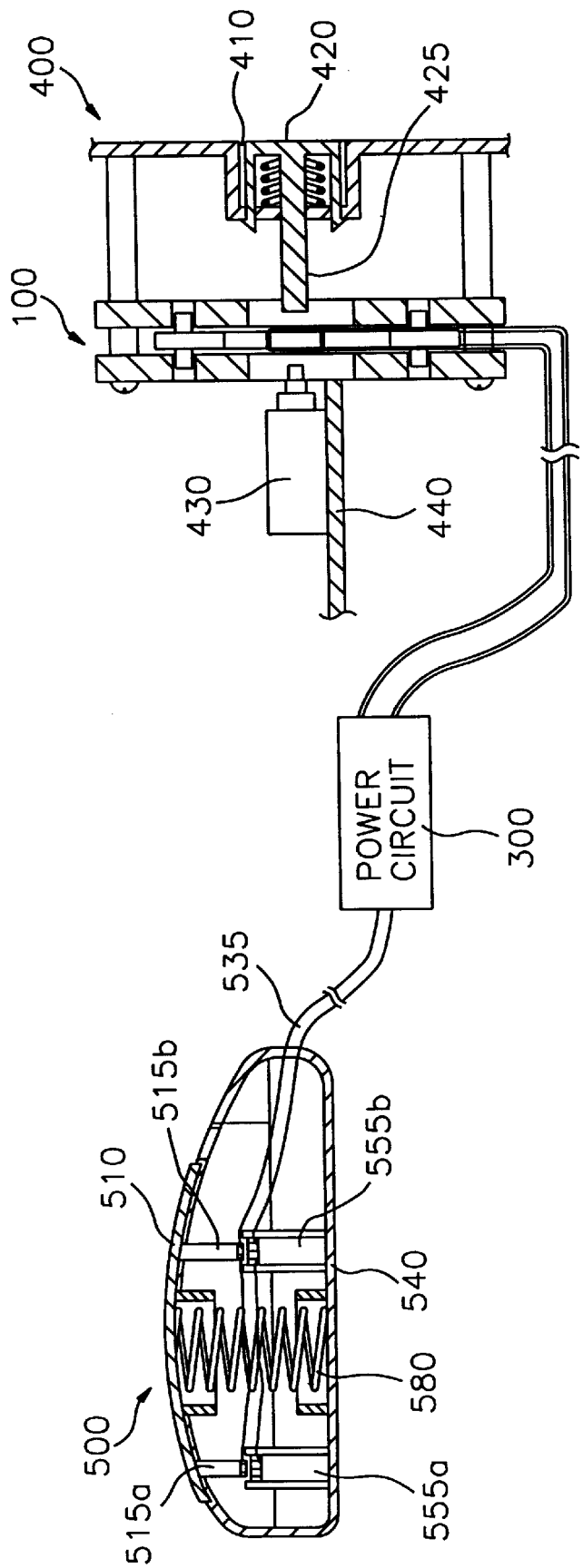
FIG. 1 is a schematic view of the device for automatically locking the power button in the computer according to an embodiment of the present invention.

As shown in FIG. 1, the device for automatically locking the power button in the computer according to the embodiment of the present invention has a power button blocking part 100, a driving part, and a power circuit 300. The power button blocking part 100 is installed between a power button 420, which is put into a button receiving hole of a computer main body 400 and moves forward and backward through the button receiving hole, and a power switch 430, which is mounted on a printed circuit board 440 and is switched by a pushing operation of the power button 420. The power switch 430 decides whether power is provided to the computer main body 400 or not. The power button blocking part 100 blocks between the power button 420 and the power switch 430 when the user puts his hand on a cover 510 of a mouse 500 connected with the computer main body 400, and thus is allowed to selectively operate the power button 420. The driving part is installed inside the mouse 500. A closed loop is composed of the power button blocking part 100, the driving part, and the power circuit 300 to generate a driving signal for driving the power button blocking part 100 when the user puts his hand on the cover 510. The power circuit 300 is installed between the driving part and the power button blocking part 100 and provides power to the power button blocking part 100 when the user puts his hand on the cover 510. The power button 420 is put in a button receiving hole 410 of the main body 400 and is elastically supported by a supporting spring in the button receiving hole 410. A pressing rod 425 is formed at a rear face of the power button 420 for turning on or off the power switch 430.

Figure 2:
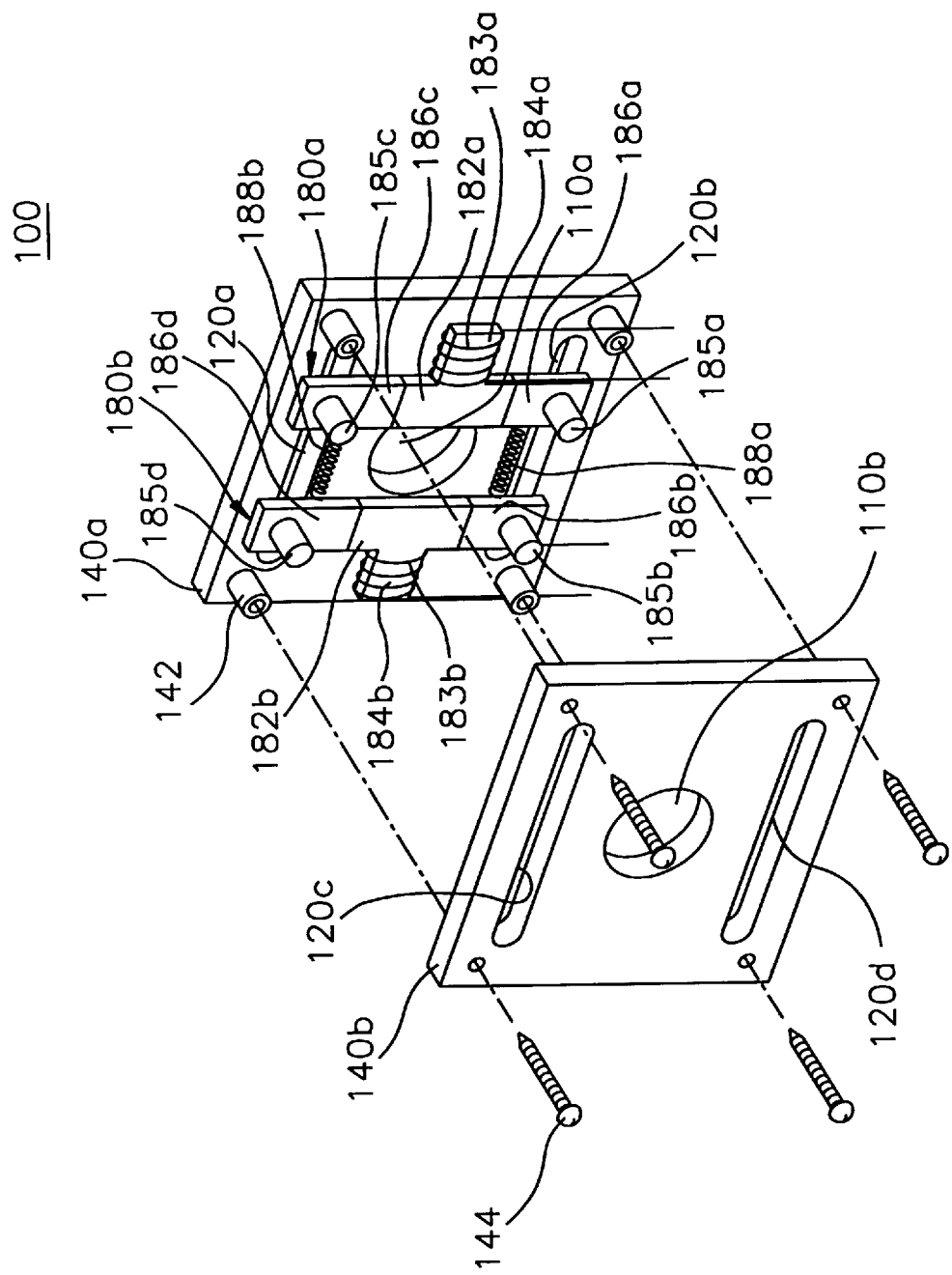
FIG. 2 is an exploded perspective view of the power button blocking part according to the embodiment of the present invention.
Figure 3:
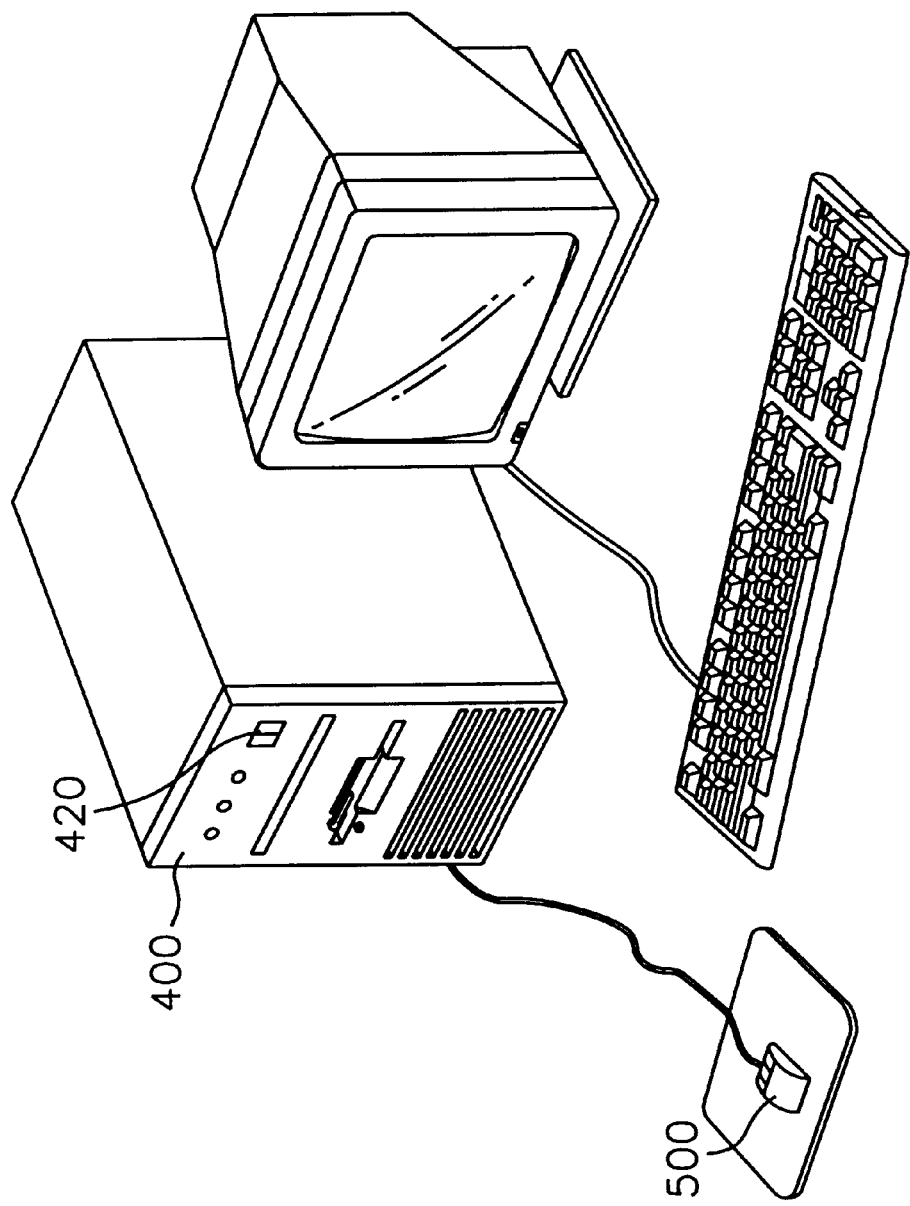
FIG. 3 is a schematic view of a general computer system.

As shown in FIG. 2, the power button blocking part 100 has a pair of supporting plates 140a, 140b, i.e., first and second supporting plates, and a pair of electromagnetic members 180a, 180b, i.e., first and second electromagnetic members. The first and second supporting plates 140a, 140b are fixed by inserting screws 144 into bosses 142 and are opposite to each other. Piercing holes 110a, 110b for receiving the pressing rod 425 of the power button 420 are formed at the center of the first and second supporting plates 140a, 140b respectively. Guiding holes 120a, 120b, 120c, 120d extended toward longitudinal direction at a predetermined length are formed at upper and lower sides of the piercing hole 110a and at upper and lower sides of the piercing hole 110b respectively. The first and second electromagnetic members 180a, 180b are installed between the first and second supporting plates 140a, 140b. The first and second electromagnetic members 180a, 180b slide in longitudinal direction of the first and second supporting plates 140a, 140b along the guiding holes for blocking the piercing holes 110a, 110b when the user puts his hand on the cover.

The first and second electromagnetic members 180a, 180b have blocking plates 182a, 182b, coil plates 184a, 184b, guiding plates 186a, 186b, and returning springs 188a, 188b. The blocking plates 182a, 182b have a function as a door of the piercing holes 110a, 110b of the supporting plates 140a, 140b. Since the coil plates 184a, 184b are formed integrally with the blocking plates 182a, 182b respectively and are wound round the coil themselves many times, the blocking plates 182a, 182b have the electromagnetic force when the power is provided from the power circuit to the coil. In the above condition, the blocking plates 182a, 182b have different polarities respectively. The guiding plates 186a, 186b, 186c, 186d are formed integrally with the upper and lower sides of the blocking plates 182a, 182b. The guiding plates 186a, 186b, 186c, 186d have guiding protrusions 185a, 185b, 185c, 185d for horizontally moving the blocking plates 182a, 182b between the supporting plates 140a, 140b by the electromagnetic force. Each of the guiding protrusions 185a, 185b, 185c, 185d is inserted into each of the guiding holes 120a, 120b, 120c, 120d respectively and guides the horizontal movement of the blocking plates 182a, 182b. The returning spring 188a has both ends fixed at the guiding plates 186a, 186b, and the returning spring 188b has also both ends fixed at the guiding plates 186c, 186d. The returning springs 188a, 188b provide the elastic force to open the piercing holes 110a, 110b when the electromagnetic force is removed from the first and second blocking plates 140a, 140b.

The driving part has a sub-cover formed as a part of the cover 510 of the mouse 500 and a spring 580 having both ends thereof fixed to the sub-cover and the base plate 540 of the mouse 500. The sub-cover of the mouse has first contacting protrusions 515a, 515b. Each of the first contacting protrusions protrudes downward from the lower face of the subcover at a predetermined length. Each of the first contacting protrusions has an electric contacting terminal at its end. The base plate 540 of the mouse 500 has second contacting protrusions 515a, 515b. Each of the second contacting protrusions upwardly protrudes from the base plate at a predetermined length at the position corresponding to each of the first contacting protrusions 515a, 515b. Each of the second contacting protrusions 555a, 555b is contacted to the corresponding first contacting protrusion when the user puts his hand on the sub-cover. Each of the second contacting protrusions 555a, 555b has an electric contacting terminal at its end.

Here, the electric contacting terminals of the first and second contacting protrusions 515a, 515b, 555a, 555b are parallel connected to the power circuit 300 through the wire 535. Since the power circuit 300 is installed between the first and second contacting protrusions 515a, 515b, 555a, 555b and the coils 183a, 183b, the power circuit 300 provides the current stream to the coils 183a, 183b when the first and second contacting protrusions 515a, 515b, 555a, 555b are contacted with each other. That is, each of the blocking plates 182a, 182b has a different polarity from each other when each of the first electromagnetic members 515a, 515b is contacted to the corresponding second electromagnetic members 555a, 555b respectively. Thus, the blocking plates 182a, 182b are close to each other, and then block the piercing holes 110a, 110b.

For opening the piercing holes when the user removes his hand from the cover, the coils 183a, 183b may be wound different direction from each other or the current directions of the coils 183a, 183b may be opposite from each other.

According to the construction described above, the device for automatically blocking the power button in the computer system is operated as follows.

When the user does the computer work with the mouse 500, the user puts his hand on the cover 510 of the mouse 500. The sub-cover is pressed down by the palm of the user's hand, and then the spring 580 is forcedly pressed. The electric contacting terminals of the first contacting protrusions 515a, 515b are contacted to the corresponding electric contacting terminals of the second contacting protrusions 555a, 555b. As the first and second contacting protrusions 515a, 515b, 555a, 555b are contacted with each other, the power circuit 300 provides power to the coils 183a, 183b of the first and second electromagnetic members 180a, 180b. When the power is provided to the coils 183a, 183b, each of the first and second electromagnetic members 180a, 180b has different polarity from each other.

As described above, the first and second electromagnetic members 180a, 180b having the different polarities from each other are contacted to each other by the electromagnetic force. The electromagnetic force is larger than the elastic force of the returning springs 188a, 188b. The guiding protrusions 185a, 185b, 185c, 185d horizontally move along the guiding holes 120a, 120b, 120c, 120d by the electromagnetic force of the first and second electromagnetic members 180a, 180b, and then the piercing holes 110a, 110b are blocked with the blocking plates 182a, 182b. At this time, when the power button 420 is pressed, the pressing rod 425 of the power button 420 is prevented from moving forward by the blocking plates 182a, 182b, and then the power switch 430 does not operate.

On the other hand, if the user removes his hand from the mouse 500, the corresponding first and second contacting protrusions (515a and 555a, or 515b and 555b) pull apart from each other by the elastic force of the spring 580, and the power circuit 300 breaks the power for preventing the current to flow through the coils 183a, 183b. Therefore, the magnetic field of the first and second electromagnetic members 180a, 180b is removed, and then the first and second electromagnetic members 180a, 180b are returned to the original positions by the elastic force of the returning spring 188a, 188b.

Thus, according to the construction described above, as the power button 420 is unable to operate itself when the user uses the mouse 500, the user can continue to do his computer work with the mouse without anxiety even though a child presses the power button.

In the device for automatically blocking the power button in the computer, even though the child presses the power button when the user does his computer work with the mouse, the power does not turn off. Thus, the device for automatically blocking the power button in the computer has an effect that the user can continue to do his computer work with a mouse without anxiety.

In the above, the present invention is described in detail by using the preferred embodiment, but the invention is not limited in the above embodiment. It should be obvious to people skilled in the conventional art that modifications can be made to the invention as described above without departing from the spirit or the scope of the invention. However, the invention is limited by the accompanying claims below.

What is claimed is:

1. A device for automatically locking a power button in a computer comprising:

a power button blocking part 100 installed between a power button 420, which is put in a button receiving hole 410 of a computer main body 400 and moves forward and backward through the button receiving hole 410, and a power switch 430, which is switched by a pressing operation of the power button 420 and determines whether the power turns on or off, and for blocking the power button 420 to switch the power switch 430 when a user puts his hand on a cover 510 of a mouse 500 connected to the computer main body 400;

a driving part installed inside the mouse 500 and for generating a driving signal to operate the power button blocking part 100 when the user puts his hand on the cover of the mouse; and a power circuit 300 installed between the driving part and the power button blocking part 100 for making a closed loop with the driving part and the power button blocking part 100 when the user puts his hand on the cover 510 and for providing power to the power button blocking part 100.

2. The device for automatically locking the power button in the computer as claimed in claim 1, wherein said power button blocking part 100 comprises:

a pair of supporting plates 140a, 140b fixed at an inner wall of the main body 400 and facing with each other, and each of which has piercing hole for moving a pressing rod 425 of the power button 420 therethrough and guiding holes formed below and above the piercing hole and extended toward a longitudinal direction of the supporting plate; and a pair of electromagnetic members 180a, 180b installed between the pair of supporting plates 140a, 140b to slide along a longitudinal direction of the supporting plates 140a, 140b for blocking the piercing holes when the user puts his hand on the cover.

3. The device for automatically locking the power button in the computer as claimed in claim 2, wherein said pair of electromagnetic members 180a, 180b comprises:

blocking plates for opening or closing the piercing holes 110a, 110b of the supporting plates 140a, 140b;

coil plates formed integrally with the blocking plate and around which being wound by coils many times for inducing an electromagnetic force on the blocking plate when the power is provided from the power circuit;

guiding plates formed integrally with upper and lower sides of the blocking plates, the guiding plates having guiding protrusions which protrude from the guiding plates and are put into the guiding holes, and for moving the blocking plates in longitudinal direction of the supporting plate; and returning springs 188a, 188b, each of which has an end and the other end fixed to the pair of electromagnetic members.

4. The device for automatically locking the power button in the computer as claimed in claim 3, wherein said driving part comprises:

at least a first contacting protrusion which protrudes toward the lower direction of an inner face of a sub-cover formed by cutting a piece from the cover 510 of the mouse 500;

at least a second contacting protrusion which protrudes toward the upper direction of a base plate 540 of the mouse 500 at a position corresponding with the first contacting protrusion; and a spring 580 having an end fixed to the sub-cover and the other end fixed at the base plate 540;

wherein the first and second contacting protrusions are contacted to each other when the sub-cover loads thereon.

5. The device for automatically locking the power button in the computer as claimed in claim 4, wherein said blocking plates 182a, 182b have different magnetic polarities when the first and second contacting protrusions are contacted to each other.

* * * * *